United States Patent [19]
Jordan et al.

[11] 3,821,008
[45] June 28, 1974

[54] SUSPENDING AGENT FOR REFRACTORY PAINTS

[75] Inventors: Wesley A. Jordan; Walter H. Carter, both of Minneapolis, Minn.

[73] Assignee: General Mills Chemicals, Inc., Minneapolis, Minn.

[22] Filed: Feb. 23, 1973

[21] Appl. No.: 335,392

Related U.S. Application Data

[63] Continuation-in-part of Ser. No. 236,287, March 20, 1972, abandoned.

[52] U.S. Cl. .............................. 106/209, 106/38.23
[51] Int. Cl. ...................... C08b 25/00, C08b 27/02
[58] Field of Search ........................ 106/209, 38.23

[56] References Cited
UNITED STATES PATENTS

| 2,639,268 | 5/1953 | Heiss | 106/209 |
| 3,275,460 | 9/1966 | Jeanneret | 106/38.23 |
| 3,428,464 | 2/1969 | Pollard | 106/38.35 |

*Primary Examiner*—Theodore Morris
*Attorney, Agent, or Firm*—Anthony A. Juettner; Gene O. Enockson; Elizabeth Tweedy

[57] ABSTRACT

Refractory paint thickened with a blend of xanthomonas and locust bean gums.

4 Claims, No Drawings

SUSPENDING AGENT FOR REFRACTORY PAINTS

This application is a continuation-in-part of our earlier filed application Ser. No. 236,287, filed March 20, 1972 and now abandoned.

This invention relates to refractory paints. In particular, this invention relates to refractory paints in which the suspending agent is a combination of xanthomonas gum and locust bean gum.

Refractory paints are used for coating metal surfaces that come in contact with hot molten metal. Examples of the type of situations where refractory paints are important are coating ingot molds, ladles and stools (bottom plate) used in the manufacture of steel. Generally, the ladles and stools are made of iron. Iron melts at a lower temperature than steel. In ingot molds and bottom plates the bulk of iron is large in order to absorb the heat with only minimum melting of the mold or bottom plate and to support the molten metal. Although iron is a good conductor of heat, localized over-heating and melting of the iron does occur and the iron and molten steel weld. Even when damage by welding does not occur, the bottom plate is able to withstand only a limited number of casts before it has to be discarded due to erosion and distortion of its top surface.

Refractory paint is made up of dense, relatively heat resistant solids, dispersed and suspended in a sol which acts as a binder. The solids are usually one or more ceramic type ingredients such as silica flour, aluminum oxide, magnesite, dolomite, graphite, fused quartz and various clays. The sol in which the above solids are dispersed and suspended is usually a silica glass sol. The silica glass sol acts as the binder for the solids. Representative refractory paint formulations typically contain about 25 percent to 45 percent refractory solids by weight, about 10 percent to 40 percent silica glass by weight and 25 percent to 40 percent water by weight. The composition of the paint should be uniform having all the solids uniformly dispersed. To keep the solids dispersed in the silica sol, the paint is agitated during the period of application. Water soluble polymers have been added to some refractory paints as an aid to suspending ingredients during agitation and application. Heretofore, starch, carboxy-methyl cellulose, cooked cereal flour and xanthomonas gum have been used as suspending aids. Too much organic material in the paint causes gassing when the molten metal comes in contact with the coating. Generally, cooked starch, carboxymethyl cellulose and cooked cereal flour do not impart truly satisfactory suspending properties at concentration levels which are economically practical and do not cause gassing. In order for xanthomonas gum to impart satisfactory suspending properties to the refractory paint, it must be a very high quality grade gum. The quality required is generally such that the xanthomonas gum at 1 percent by weight concentrations must develop a viscosity of 800 centipoise in 15 minutes in sols of 7.5 percent silica glass by weight and a viscosity of 2,600 centipoise in 24 hours as measured at a temperature of 25°C.±1°C. A gum of this quality is expensive. Moreover, at the concentration levels of xanthomonas gum required to obtain satisfactory suspension of refractory solids, the price of the gum substantially adds to the cost of the paint.

It has now been found that a mixture of xanthomonas gum and locust bean gum yields a colloid in aqueous silica sol that keeps the above solids suspended in refractory paint. The xanthomonas gum-locust bean mixture can be used at lower concentration levels of organic material than known suspending agents including xanthomonas gum itself. Furthermore, the mixture permits the use of even the lowest quality grades of both xanthomonas and locust bean gum. Because low concentrations of the gum mixture can be used and low quality grade gums can be used in the mixtures, these mixtures make possible a substantial economic benefit in the formulation of refractory paint. The suspending ability of these mixtures is not predictable from their viscosities. As described below, however, viscosity has been used to define the minimum quality of xanthomonas gum useful in this invention.

The term "xanthomonas gum" as used herein means the general class of heteropolysaccharides produced by the action of bacteria of the genus Xanthomonas upon a variety of carbohydrate substances, including simple sugars such as glucose and fructose, sucrose and starch. Representative bacteria are *Xanthomonas Campestris*, *Xanthomonas Phaseoli*, *Xanthomonas Mulvacearam*, *Xanthomonas Carotae*, *Xanthomonas Translucens*, *Xanthomonas Hederae* and *Xanthomonas Papavericola*. The gum produced by the bacteria *Xanthomonas Campestris* is preferred for the purposes of this invention. The xanthomonas gum used in the specific examples set out below to illustrate the present invention was made by a preparation procedure involving the following steps. In the first step the bacteria was grown on an agar slant. In the second step bacteria from the slant was used to inoculate two liter aliquots of a fermentable broth containing per liter: sucrose, 20 grams; $Na_2HPO_4 \cdot 12H_2O$, 8 grams; $NaH_2PO_4$, 1 gram; $MgSO_4 \cdot 7 H_2O$, 0.25 gram; and 90 grams of cooked soy meal dispersion. The cooked soy meal suspension was made by agitating at 180 rpm, 90 grams of soy meal in 600 ml. of water at a temperature of 90°C. for a period of 30 minutes and then centrifuging and discarding the residue. The above broth was allowed to ferment for a period of 31 hours at a temperature of about 28° to 30°C. In the third step the broth was used to inoculate a 15 liter batch containing the same broth composition. The broth of the third step was allowed to ferment for a period of 29 hours at a temperature of about 28° to 30°C. The broth from the third step was used to inoculate a 15,000 liter batch of broth having the composition per liter of sucrose, 20 grams; cooked soy meal dispersion, 6 grams; rapeseed oil, 0.65 gram; sulfuric acid, 0.53 gram; $MgSO_4 \cdot 7H_2O$, 0.25 gram; $Na_2HPO_4 \cdot 12H_2O$, 15 grams and tap water. The final batch was allowed to ferment for a period of about 72 hours at a temperature of about 28°C. to 30°C. At the end of the final fermentation period the broth was steam sterilized to destroy all the viable microorganisms. The pH of the broth was then adjusted to 7.9 by the addition of potassium hydroxide and the gum recovered from the broth by the addition of isopropyl alcohol and dried. The product obtained from batch to batch are somewhat variable in their solubility in silica glass. Xanthomonas gum is commercially available and is prepared by fermentation processes which may vary in particulars from the procedure set out above. Xanthomonas gum made by commercial processes can be used in the practice of the present invention.

Xanthomonas gum useful in the practice of this invention should, at a 1 percent by weight concentration in a sol containing 7.5 percent silica glass by weight, develop a viscosity of above about 150 centipoise in a 24 hour period and preferably above about 700 centipoise as measured at a temperature of 25°C.±1°C. As can be readily appreciated, far lower quality xanthomonas gum can be used in the practice of this invention than can be used when xanthomonas gum is the sole suspension aid in a refractory paint. Locust bean gum of a quality grade containing at least 40 percent galactomannan can be used. For the purposes of this invention the blend of these gums contain at least 0.02 percent xanthomonas gum based on the weight of the refractory paint. Preferably the gum blends contain about 10 percent to 50 percent locust bean gum by weight and from 50 percent to 90 percent xanthomonas gum by weight. Most preferred are the gum blends containing about 20 percent to 40 percent locust bean gum by weight and about 60 percent to 80 percent xanthomonas gum by weight. The gum blends are used in the refractory paint in amounts that suspend the solids but do not cause gassing upon contact with the molten metal. Gum blends in amounts of about 0.10 percent by weight of the total paint composition have prevented total settling of the solids for a period of 24 hours. Locust bean gum is a natural product and there is some variation in its effectiveness. Preferably the gum blends are used in amounts of about 0.15 percent to 1.0 percent by weight of the sol.

The suspending properties of the gum blends are illustrated below by specific compositions and measurement made on those compositions. All viscosity measurements in the following work were taken with a Brookfield viscometer using spindle no. 3 rotating at 60 rpm and at a temperature of 25°C.±1°C.

EXAMPLE I

This series of samples illustrates the effect of the ratio of locust bean gum to xanthomonas gum upon the suspension of a representative refractory paint suspension.

A mixture having the following composition was dry blended.

| Component | Grams |
| --- | --- |
| Aluminum Oxide | 21.3 |
| Silica Flour (400 mesh through U.S. Standard Sieve) | 21.2 |
| Magnesite (400 mesh through U.S. Standard Sieve) | 42.5 |
| Gum Ingredient* | 0.3 |
| | 85.3 |

*The composition of the gum ingredient is shown in Table I.

The binding vehicle for the refractory paint samples was made by dispersing 50 grams of water glass (30% $SiO_2$) in 65 grams of water.

The dry blended mixture was added to the binding vehicle with stirring and the resulting dispersion was thereafter stirred for five minutes. The paints thus made were transferred to 250 ml. beakers for solid settling and viscosity measurements made over a 24 hour period. The measurements are shown in Table I.

Table I shows:
1. The composition of the gum ingredient of each paint sample,
2. The thickness of the clear layer floating on top of the layer containing the solids after a period of 24 hours,
3. The viscosity of the paint samples after a period of 24 hours.

Table I

Suspending Properties and Viscosity of Different Xanthomonas and Locust Bean Gum Ratios

| % Xanthomonas gum | 100 | 90 | 80 | 70 | 60 | 50 | 40 | 30 | 20 | 10 | 0 |
| --- | --- | --- | --- | --- | --- | --- | --- | --- | --- | --- | --- |
| % Locust Bean Gum | 0 | 10 | 20 | 30 | 40 | 50 | 60 | 70 | 80 | 90 | 100 |
| Thickness of floating layer, mm. | 9 | 6 | 2 | 2 | 3 | 7 | 18 | 19 | 20 | 20 | 20 |
| Viscosity, cps. | 450 | 480 | 440 | 430 | 400 | 370 | 280 | 190 | 140 | 90 | 20 |

A thin surface layer of aqueous fluid on a paint after settling is desirable to prevent drying and skinning of the surface. The best samples for the purposes of a refractory paint are those having a top layer not exceeding 3 mm. thickness. The samples having floating layer thicknesses of 3 up to about 9 mm. could be used if stirred before the paint sample was applied. The paint samples having floating layer thicknesses of 9 mm. or more caked badly and their restoration to a sprayable consistency would have been very difficult. It should be noted that the suspending power of the gum blends is not determined by the particular viscosity developed by the blend.

EXAMPLE II

This series of paint samples illustrates the greater ability of a blend containing 75 percent xanthomonas gum and 25 percent locust bean gum both by weight to suspend solids than xanthomonas gum alone.

A mixture having the following composition was dry blended.

| Components | Grams |
| --- | --- |
| Aluminum Oxide | 21.3 |
| Silica Flour (400 mesh through U.S. Standard Sieve) | 21.2 |
| Magnesite (400 mesh through U.S. Standard Sieve) | 42.5 |
| Gum Ingredient* | x |

*The gum ingredient composition and the grams used in each sample are shown in Table II.

The binding vehicle for the refractory paint samples was made by dispersing 50 grams of water glass (30%

SiO₂) in 65 grams of water. The binding vehicle was put in a Waring Blendor cup. It was stirred vigorously while the dry blended mixture was added to it. Stirring was continued for 5 minutes thereafter. During the first four hours of aging, the samples were slowly stirred occasionally with a spatula to observe "fall out" of solid particles. The mixtures were allowed to stand in a quiescent state overnight and 24 hours after mixing the degree of layering and caking was observed. These observations are shown in Table II.

Table II shows:

1. The comparable efficiency of xanthomonas gum alone and a blend of xanthomonas gum and locust bean gum for suspending solids, 2. The concentrations of the xanthomonas gum and the blend of xanthomonas and locust bean gums that kept the solids in the particular formulation set out above in suspension, 3. The relative viscosities of the refractory paint samples thickened with xanthomonas gum alone and with the blend of xanthomonas gum and locust bean gum.

5 grams of Xanthomonas gum in 495 grams of an aqueous solution containing 7.5 percent sodium silicate by weight. The dispersion of gum sample and the sodium silicate solution were stirred with a Waring Blendor. Stirring was continued for one minute after the gum was added. After stirring the samples for one minute, they were poured into 600 ml. beakers and the viscosities of the samples measured after a period of 15 minutes and again after a period of 24 hours. The viscosity of the samples are shown in Table III.

Five samples of xanthomonas gum corresponding to the above five samples in quality were made up into refractory paint samples. The composition of the refractory paint samples were as follows:

| Component | Grams |
|---|---|
| Magnesium Carbonate | 85.0 |
| Sodium Silicate | 15.0 |
| Water | 100.0 |
| Gum Sample | 0.3 |

Table II

Suspending Properties and Viscosity at Different Concentrations

| % by wt. thickeners in paint samples | 0.25 | 0.225 | 0.200 | 0.175 | 0.150 | 0.125 | 0.100 | 0.075 |
|---|---|---|---|---|---|---|---|---|
| Xanthomonas Gum | | | | | | | | |
| Thickness of floating layer after settling of solids, mm. | 0 | 0 | 0 | 1 | 9 | 15 | 20 | 21 |
| Viscosity of slurry after 24 hrs., cps. | 1220 | 1020 | 810 | 660 | 450 | 340 | 250 | 140 |
| 75% Xanthomonas Gum and 25% Locust Bean Gum Blend | | | | | | | | |
| Thickness of floating layer after settling, mm. | 0 | 0 | 0 | 0 | 0 | 5 | 11 | 20 |
| Viscosity of slurry after 24 hrs., cps. | 990 | 810 | 700 | 580 | 460 | 320 | 240 | 140 |

The data show that about 0.125 percent by weight of the xanthomonas gum-locust bean gum blend suspended the solids. The data also show that about 0.175 percent of xanthomonas gum alone was required to suspend the solids. The reduction of gum is about 28 percent. The data further show that the viscosity of the refractory paint samples thickened with the blend of xanthomonas and locust bean gum are less viscous than the refractory paint samples thickened with xanthomonas gum alone and are therefore more easily sprayed.

EXAMPLE III

This example illustrates the quality of xanthomonas gum that is necessary when used as the sole thickener for refractory paints and the quality of xanthomonas gum that can be used in a blend of xanthomonas gum when used in a blend with locust bean gum to thicken refractory paint.

Five samples of xanthomonas gum of varying quality were tested for utility as a suspending agent for refractory paint. The first part of the test involved dispersing The magnesium carbonate, sodium silicate and gum sample were dry blended and stirred into the water with a Waring Blendor for 5 minutes. The samples were then transferred to 250 ml. beakers for observation.

A second series of five samples of xanthomonas gum corresponding to the initial samples in quality were blended with locust bean gum in a ratio of 70 percent xanthomonas gum sample and 30 percent locust bean gum by weight. These five samples of the blends containing xanthomonas gum corresponding to the quality of the original xanthomonas gum samples and blended with locust bean gum were made up into refractory paints in the same ratio and manner as described above.

The viscosities of the xanthomonas gum samples are shown in TBLE III. The stability of the refractory paints made from corresponding xanthomonas gum samples and refractory paint made from corresponding xanthomonas gum samples blended with locust bean gum are shown in Table III. The data show that a higher quality xanthomonas gum was necessary when xanthomonas gum was used as the sole thickener than was required when the xanthomonas gum was blended with locust bean gum.

Table III

Quality of Xanthomonas Gum and Acceptance of Paint Made Therefrom

| Sample No. | 1 | 2 | 3 | 4 | 5 |
|---|---|---|---|---|---|
| Xanthomonas Gum Viscosity in 7.5% Na$_2$SiO$_3$ Solution | | | | | |
| After 15 min. | 800 | 200 | 300 | 100 | 100 |
| After 24 hrs. | 2600 | 700 | 2600 | 1000 | 150 |
| Stability of Paint Made With Xanthomonas Gum Alone After 24 hrs. | Pass* | Fail* | Fail* | Fail* | Fail* |
| Stability of Paint Made With Xanthomonas Gum/Locust Bean Gum Blend After 24 hrs. | Pass* | Pass* | Pass* | Pass* | Fail* |

*Pass = the floating layer as visually measured was not more than 3 mm. thick.
*Fail = the floating layer as visually measured was more than 3 mm. thick.

The above data show that only relative high quality xanthomonas gum can produce good suspension when used alone. The data also show that xanthomonas gum of lesser quality can be used in conjunction with locust bean gum to produce good suspension.

EXAMPLE IV

This example illustrates that a wide quality range of locust bean gum can be used in the practice of this invention. Five samples showing the compositions of commercially available locust bean gum are shown in Table IV. These samples were made up into refractory paint samples as described in Example II using xanthomonas gum corresponding to sample 1, Example III. The viscosities of these refractory paints and the suspension of solids after 24 hours is set out in Table IV.

Table IV

Composition of Locust Bean Gum and Acceptance of Paint

| Sample No. Locust Bean Gum Composition | 1 | 2 | 3 | 4 | 5 |
|---|---|---|---|---|---|
| Protein | 5.5 | 5.1 | 15.2 | 5.8 | 5.2 |
| Ash | 1.0 | 1.0 | 2.3 | 1.2 | 0.9 |
| Fiber | 1.3 | 2.4 | 4.0 | 2.5 | 1.8 |
| Fat | 1.0 | 0.9 | 2.0 | 0.8 | 0.7 |
| Moisture | 12.4 | 12.0 | 12.0 | 11.2 | 7.8 |
| Gum (By difference) | 78.8 | 78.6 | 64.5 | 78.5 | 83.6 |
| Viscosity of Paint (cps) | 420 | 300 | 310 | 300 | 372 |
| Suspension of Paint after 24 hours | Pass* | Pass* | Pass* | Pass* | Pass* |

*Pass = the floating layer not more than 3 mm. thick.

The embodiments of the invention in which an exclusive property or privilege is claimed are defined as follows:

1. A refractory paint comprising at least one refractory solids ingredient dispersed in a silica glass sol and a suspending agent present in amounts sufficient to retain the refractory solids in suspension and insufficient to cause gassing when the refractory paint contacts molten metal, said suspending agent comprising a blend of about 90 percent to 50 percent xanthomonas gum by weight and about 10 percent to 50 percent locust bean gum by weight wherein said xanthomonas gum is present in amounts of at least 0.02 percent by weight of the refractory paint, said xanthomonas gum being of a quality that will, at a 1 percent by weight concentration in a sol containing 7.5 percent silica glass, develop a viscosity of above about 150 centipoise in a 24 hour period measured at a temperature of 25°C.±1°C.

2. The refractory paint of claim 1 wherein the suspending agent is a blend of about 80 percent to 60 percent xanthomonas gum by weight of the blend and about 20 percent to 40 percent locust bean gum by weight of the blend.

3. The refractory paint of claim 1 wherein the refractory solids ingredient is present in an amount of about 25 percent to 45 percent by weight of the composition, the silica glass is present in an amount of about 10 percent to 40 percent by weight of the composition and water is present in an amount of about 25 percent to 40 percent by weight of the composition.

4. The refractory paint of claim 1 wherein the suspending agent is present in amounts of about 0.10 percent to 1.0 percent by weight of the composition.

* * * * *